J. Dennis, Jr.
Distilling Liquor.
No. 93,523. Patented Aug. 10. 1869.
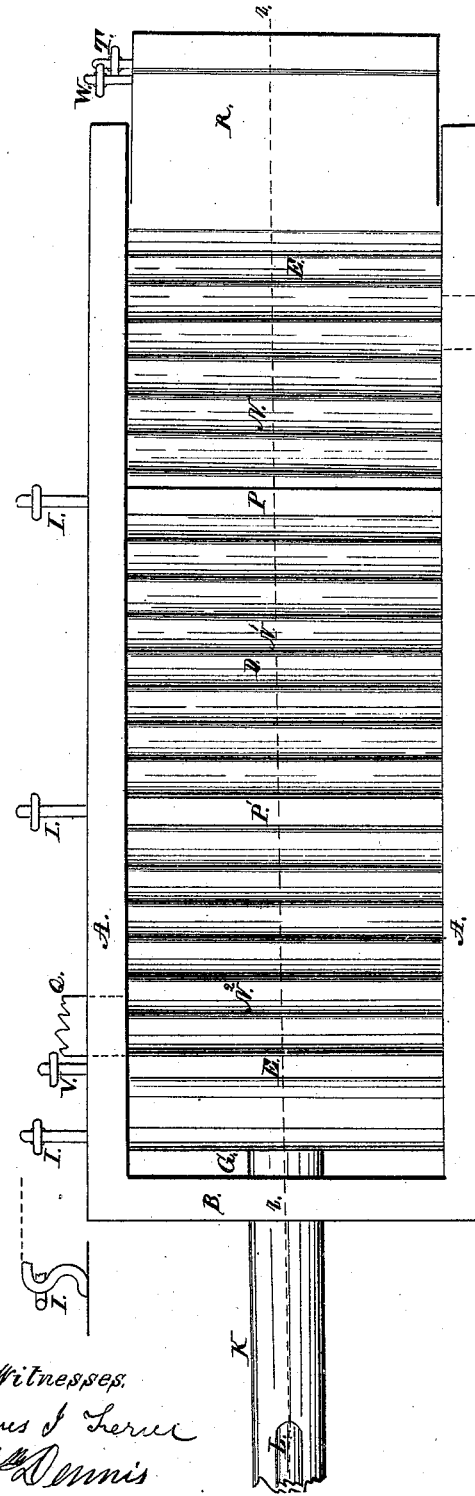
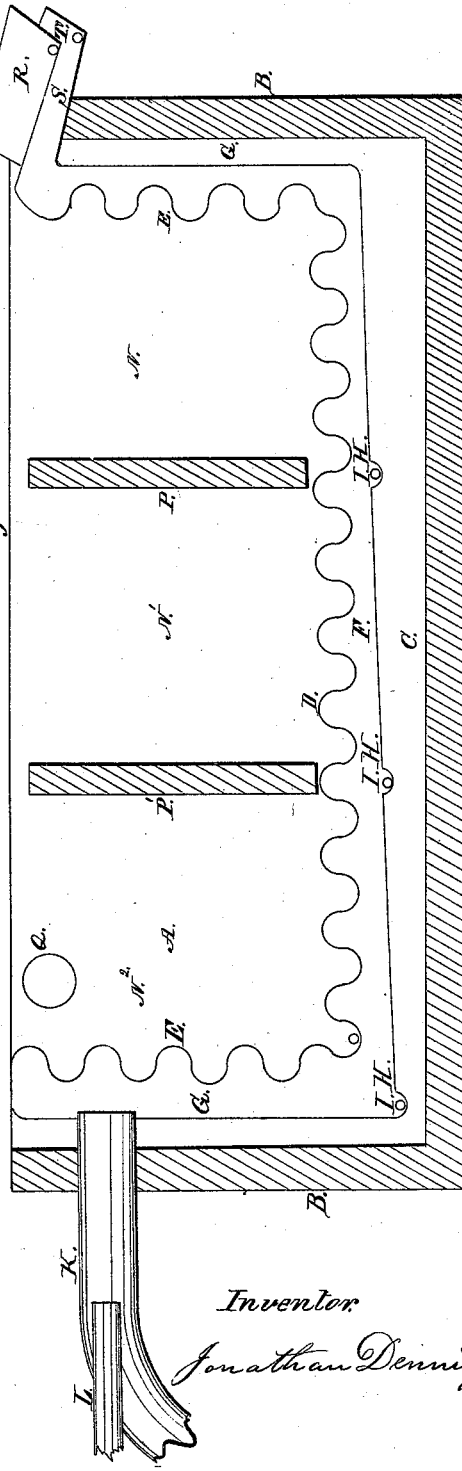
Witnesses:
James J. Ferrer
Wm Dennis
Inventor
Jonathan Dennis Jr.

United States Patent Office.

JONATHAN DENNIS, JR., OF WASHINGTON, DISTRICT OF COLUMBIA.

Letters Patent No. 93,523, dated August 10, 1869; antedated February 10, 1869.

---

IMPROVEMENT IN DISTILLING ALCOHOLIC SPIRITS AND LIQUORS.

---

The Schedule referred to in these Letters Patent and making part of the same.

---

*To all whom it may concern:*

Be it known that I, JONATHAN DENNIS, Jr., of Washington, in the District of Columbia, have invented or discovered certain new and useful Improvements in the Process of, and Apparatus for, Distilling Alcohol and other Liquors; and I do hereby declare the following description or specification, and accompanying drawings, are sufficient to enable any person skilled in the art or science to which it most nearly appertains, to make and use my said invention or discovery and improvements, without further invention or experiment.

On learning that alcoholic liquors were greatly improved by exposure to atmospheric air, either by blowing the air into the liquor, or letting the liquor or alcohol run or trickle very slowly down some fibrous or other substance, through the air, to deprive it of its offensive or bad qualities or properties, and give it the flavor, quality, or property of age, or of old liquor, it occurred to me that this might be effected far more easily, more perfectly, and to greater advantage, by applying the air to the alcoholic vapor, while in a gaseous or aeriform state, and mixing the air thoroughly with the alcoholic vapor in the process of distillation, before it was condensed, either in the still or in the pipe leading from the still to the worm or condenser, or in the worm or condenser, or in each or all of these together, as by mixing and mingling the air with the alcoholic vapor, before it was condensed, the air could act on it more effectually and perfectly than it could possibly do after it was condensed into a liquid form.

The nature or essence of my invention, discovery, and improvement in the process of, and apparatus for, distilling alcohol, rum, gin, brandy, whiskey, and other alcoholic liquors and cordials from grain, and other materials or substances, and in rectifying alcoholic liquors, consists in introducing atmospheric air or some suitable gas into the alcoholic vapor, while it is in an aeriform or gaseous state, and mixing and mingling the air or gas thoroughly with the alcoholic vapor, so that they may act fully and perfectly upon the vapor, before it is condensed, to neutralize the fusel-oil, or other deteriorating oils or gases, and otherwise improve the product of distillation; and in inserting a pipe into the gooseneck of the still, or into the pipe that connects the still or retort with the worm or condenser, to conduct air or gas into the vapor or gaseous products of distillation, from an air-pump, bellows, or other air-propelling device; and so arranging the mouth of the pipe that conducts the air into the gooseneck or pipe, from the still or retort to the worm or condenser, that the air blown in shall propel, or tend to propel, the vapor forward in the gooseneck or pipe toward and through the worm or condensing-apparatus; and in introducing the air or gas into the vapor distilled at such a temperature as will render it the most available, in acting on the vapor from the still or retort, to produce the greatest benefit to the products of distillation; and in utilizing the air or gas introduced to improve the product of distillation, by using it to propel the vapor or products of distillation forward in the worm or condenser; and, in combination with the introduction of air or gas into the alcoholic vapor or products of distillation, the application and use of an air-pump, fan, or other pneumatic device, to draw the vapor from the retort through the worm or condenser, or to draw the vapor from the retort, and force it into or through the worm or condenser; also, in arranging an ice-box at the end of the condenser, to condense what may remain in the vapor or air flowing from the condenser, that may be condensed by the temperature of the ice-box.

To enable others skilled in the art of distilling, to make and use my invention or discovery, I will proceed to describe the best apparatus I have devised for putting my new process in practice, referring to the accompanying drawings, forming part of this specification, in which—

Figure 1 is a plan or top view of the gooseneck or pipe, leading from the still or retort and the condenser.

Figure 2 is a vertical section through the centre of fig. 1, on the line z–z.

In these drawings—

A A are the sides of the condensing-vat, which may be made of wood, or other suitable materials.

B B are the outside wooden ends, and C the bottom.

I then take plate or sheet-metal, such as is suitable for the purpose, which is well known to distillers, and corrugate it, as shown in section, fig. 2, and form the bottom D and ends E E, and connect them to the sides A A, air and steam-tight.

Outside of the bottom D and ends E, I make a second bottom, F, and ends G G, of sheet-metal, and arrange it a proper distance from the bottom D, for the vapor or products of distillation to pass, and be condensed on the bottom D, and run off on to the bottom F, and collect in the several grooves H H H in the bottom F, and run out, through the cocks I I I, into proper receptacles arranged to receive it.

The cocks I I are arranged at the ends of the grooves H H, in the bottom F, and provided with a curve downward, as shown in fig. 3, to form a trap, and prevent the escape of the vapor through the cocks.

The bottom F and ends G G are fastened to the sides A A, so as to be water and steam-tight, and the tops of the ends E and G, at J, must be made tight also.

The pipe K passes through the end B and into the end E, where it is made tight, and the pipe L is inserted in the pipe K, as shown in fig. 2.

The pipe L is connected with the still or retort, to convey the products of distillation into the pipe K, through which it passes in between the ends E and G of the condenser, and thence along between the bottoms D and F, where it is condensed by the cold water, supplied through the pipe M, to the compartments N N$^1$ N$^2$ of the condenser-vat, which is provided with partitions P P', which may be made hollow, or of some material that will conduct heat very slowly, so that the water in the compartment N, which receives the water first, will always be at the lowest temperature, and condense the products of distillation last; and when the water is slightly heated, it passes under the partition P, into the compartment N¹, where it is warmed a little more, in condensing the vapor under it, and then passes under the partition P', into the compartment N², and becomes further heated, and escapes through the pipe Q and runs away.

I prefer to make the water run under the partitions, but it may be made to run over them, or through holes made in the partitions for that purpose.

If the vapor issues from the pipe L with sufficient force, it will draw the atmosphere in through the pipe K, and carry it along into the condenser with it; but it will be best to apply a pump, or some blowing-apparatus, to blow the air into the pipe K, and force it by the end of the pipe L, so as to produce a partial vacuum in the pipe L, and suck or draw the vapor from the still, and pass or blow it along under the condenser, where the vapor will be condensed, and the air pass on and out under the ice-box R, arranged at the end of the condenser, to condense anything that remains in the vapor or air, after it passes the water-condenser.

The bottom of the ice-box R is inclined, as shown in the drawings, so that all that is condensed on it runs off into the inclined box or trough S, under it, and out at the faucet T, into a proper receptacle arranged to receive it.

The ice in the box may be protected by a double case of boards at the sides and top, so as to thaw but little, except on the bottom, which is made of sheet-metal, and will be but little above freezing, so as to condense all that will condense at that temperature.

There is a faucet at V, for emptying the water in the vat, and one at W, to draw the water from the ice-box, and it may be some advantage to run the water from the ice-box into the vat of the condenser.

The corrugations of the condenser have a tendency to make the vapor revolve, and bring it all fairly in contact with the condensing-surface.

If it is preferred that way, the pipe K may be attached to the retort or still, and the air forced in through the pipe L, and the diameter of K reduced around the end of the pipe L, so that the air issuing from L will tend to produce a vacuum in K, and in the still or retort to which it is connected, so as to work the still at a low temperature, lower than it could be worked under atmospheric pressure.

I contemplate that my discovery and improvements in distilling may be used in redistilling, rectifying, or otherwise preparing distilled and other liquors.

Having described my discovery or invention,

What I claim as my invention and improvement in distilling and rectifying alcohol and alcoholic liquors, as rum, gin, brandy, whiskey, &c., from grain, or other substances or materials, is—

1. Injecting and mixing or mingling atmospheric air or gas with the alcoholic vapor, while it is in an aeriform or gaseous state, and before it is condensed, for the purpose of neutralizing or destroying the fusel-oil and other deleterious oils and gases, and giving the liquor so distilled the quality technically termed age by liquor-dealers.

2. Inserting a pipe into the gooseneck of the still, or into the pipe that connects the still or retort with the worm or condenser, to conduct air or gas into the vapor or gaseous products of distillation, by the suction of the vapor from the still, or to convey the air from an air-pump, bellows, or other air-propelling device, into the vapor distilled, before it is condensed.

3. Also, arranging the mouth of the pipe that conducts the air into the gooseneck or pipe, from the still or retort to the worm or condenser, so that the blast of air blown in shall propel the vapor forward in the gooseneck or pipe, toward and through the worm or condenser, substantially as described.

4. Introducing the air or gas into the vapor, at such a temperature as will render it the most available in acting on the vapor from the retort, to produce the greatest benefit to the product of distillation.

5. Also, utilizing the air or gas blown in, or introduced into the vapor, to improve the product of distillation, by using it to propel the vapor or products of distillation forward into and through the worm, or through the worm or condenser, substantially as described.

6. In combination with the introduction of air or gas into the alcoholic vapor or products of distillation, the application and use of an air-pump, fan, or other pneumatic device, to draw the vapor from the retort, and force it into or through the worm or condenser.

7. Arranging an ice-box at the end of the condenser, to condense whatever may remain in the vapor or air flowing from the water-condenser that is capable of being condensed at the temperature of the ice-box.

JONATHAN DENNIS, Jr.

Witnesses:
WM. DENNIS,
WM. H. DENNIS.